(12) United States Patent
Liu et al.

(10) Patent No.: US 9,350,946 B2
(45) Date of Patent: May 24, 2016

(54) INFORMATION PROCESSING METHOD AND APPARATUS FOR VIDEO COMMUNICATION

(71) Applicant: Huawei Technologies Co., Ltd., Shenzhen (CN)

(72) Inventors: Chang Liu, Shenzhen (CN); Kai Li, Shenzhen (CN); Junhua Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/743,089

(22) Filed: Jun. 18, 2015

(65) Prior Publication Data

US 2015/0288924 A1 Oct. 8, 2015

Related U.S. Application Data

(63) Continuation of application No. PCT/CN2013/083166, filed on Sep. 10, 2013.

(30) Foreign Application Priority Data

Dec. 24, 2012 (CN) .......................... 2012 1 0568135

(51) Int. Cl.
*H04N 7/15* (2006.01)
*H04N 7/14* (2006.01)
(Continued)

(52) U.S. Cl.
CPC .............. *H04N 7/15* (2013.01); *G06K 9/00288* (2013.01); *G06K 9/00302* (2013.01); *G06K 9/00711* (2013.01); *H04L 12/1822* (2013.01); *H04L 65/403* (2013.01); *H04N 7/147* (2013.01)

(58) Field of Classification Search
CPC ...... H04N 7/15; H04N 7/147; H04L 12/1022; H04L 65/403; G06K 9/00302; G06K 9/00711; G06K 9/002888
USPC .............. 348/14.01–14.16; 709/204; 715/753
See application file for complete search history.

(56) References Cited

U.S. PATENT DOCUMENTS 7,920,160 B2 * 4/2011 Tamaru ................... H04M 3/56
348/14.08
2007/0263826 A1 11/2007 Tamaru et al.
(Continued)

FOREIGN PATENT DOCUMENTS

CN 1254145 A 5/2000
CN 2558017 Y 6/2003
(Continued)

OTHER PUBLICATIONS

Partial English Translation and Abstract of Chinese Patent Application No. CN1254145, Sep. 23, 2015, 13 pages.
(Continued)

*Primary Examiner* — Melur Ramakrishnaiah
(74) *Attorney, Agent, or Firm* — Conley Rose, P.C.; Grant Rodolph; Nicholas K. Beaulieu

(57) ABSTRACT

An information processing method and apparatus for video communication are provided. The method includes identifying each participant in current video communication, and allocating a unique participant identity and a role identifier; acquiring initialization information of the current video communication, and collecting information of a current video communication process; obtaining, by means of search according to an association relationship between a role identifier of a participant in the current video communication and a preset policy, the preset policy corresponding to the participant in the current video communication; summarizing the initialization information and the information of the current video communication process by using the preset policy, to obtain evaluation information of the current video communication. In the foregoing manner, initialization information of video communication and information of a video communication process are made full use of, which can effectively improve a video communication effect.

21 Claims, 7 Drawing Sheets

(51) Int. Cl.
*H04L 29/06* (2006.01)
*H04L 12/18* (2006.01)
*G06K 9/00* (2006.01)

(56) References Cited

U.S. PATENT DOCUMENTS

| | | | |
|---|---|---|---|
| 2012/0056974 | A1 | 3/2012 | Wu |
| 2012/0206561 | A1 | 8/2012 | Huang |
| 2014/0099075 | A1* | 4/2014 | Li .................. H04N 7/155 386/241 |

FOREIGN PATENT DOCUMENTS

| | | | |
|---|---|---|---|
| CN | 1731456 | A | 2/2006 |
| CN | 1747563 | A | 3/2006 |
| CN | 1780344 | A | 5/2006 |
| CN | 1797441 | A | 7/2006 |
| CN | 1838181 | A | 9/2006 |
| CN | 1932843 | A | 3/2007 |
| CN | 001959742 | A | 5/2007 |
| CN | 101030244 | A | 9/2007 |
| CN | 101055561 | A | 10/2007 |
| CN | 101082996 | A | 12/2007 |
| CN | 101188743 | A | 5/2008 |
| CN | 101237704 | A | 8/2008 |
| CN | 101246604 | A | 8/2008 |
| CN | 101510990 | A | 8/2009 |
| CN | 101794465 | A | 8/2010 |
| CN | 101887538 | A | 11/2010 |
| CN | 201853270 | U | 6/2011 |
| CN | 102243772 | A | 11/2011 |
| CN | 202025355 | U | 11/2011 |
| CN | 202043281 | U | 11/2011 |
| CN | 202084078 | U | 12/2011 |
| CN | 102572356 | A | 7/2012 |
| CN | 102647577 | A | 8/2012 |

OTHER PUBLICATIONS

Partial English Translation and Abstract of Chinese Patent Application No. CN1731456, Sep. 23, 2015, 13 pages.
Partial English Translation and Abstract of Chinese Patent Application No. CN1747563, Sep. 23, 2015, 31 pages.
Partial English Translation and Abstract of Chinese Patent Application No. CN1780344, Sep. 23, 2015, 10 pages.
Partial English Translation and Abstract of Chinese Patent Application No. CN1797441, Sep. 23, 2015, 12 pages.
Partial English Translation and Abstract of Chinese Patent Application No. CN1838181, Sep. 23, 2015, 16 pages.
Partial English Translation and Abstract of Chinese Patent Application No. CN1932843, Sep. 23, 2015, 9 pages.
Partial English Translation and Abstract of Chinese Patent Application No. CN1959742, Sep. 23, 2015, 5 pages.
Partial English Translation and Abstract of Chinese Patent Application No. CN2558017, Sep. 23, 2015, 10 pages.
Partial English Translation and Abstract of Chinese Patent Application No. CN101030244, Sep. 29, 2015, 30 pages.
Partial English Translation and Abstract of Chinese Patent Application No. CN101082996, Sep. 23, 2015, 33 pages.
Partial English Translation and Abstract of Chinese Patent Application No. CN101188743, Sep. 23, 2015, 7 pages.
Partial English Translation and Abstract of Chinese Patent Application No. CN101237704, Sep. 23, 2015, 17 pages.
Partial English Translation and Abstract of Chinese Patent Application No. CN101246604, Sep. 23, 2015, 5 pages.
Partial English Translation and Abstract of Chinese Patent Application No. CN101794465, Sep. 23, 2015, 20 pages.
Partial English Translation and Abstract of Chinese Patent Application No. CN101887538, Sep. 23, 2015, 9 pages.
Partial English Translation and Abstract of Chinese Patent Application No. CN102243772A, Sep. 23, 2015, 3 pages.
Partial English Translation and Abstract of Chinese Patent Application No. CN201853270, Sep. 23, 2015, 8 pages.
Partial English Translation and Abstract of Chinese Patent Application No. CN202025355, Sep. 23, 2015, 4 pages.
Partial English Translation and Abstract of Chinese Patent Application No. CN202043281, Sep. 23, 2015, 14 pages.
Partial English Translation and Abstract of Chinese Patent Application No. CN202084078, Sep. 23, 2015, 5 pages.
Foreign Communication From a Counterpart Application, PCT Application No. PCT/CN2013/083166, English Translation of International Search Report dated Dec. 19, 2013, 2 pages.
Foreign Communication From a Counterpart Application, PCT Application No. PCT/CN2013/083166, English Translation of Written Opinion dated Dec. 19, 2013, 8 pages.

* cited by examiner

INFORMATION PROCESSING METHOD AND APPARATUS FOR VIDEO COMMUNICATION

CROSS-REFERENCE TO RELATED APPLICATIONS

This application is a continuation of International Application No. PCT/CN2013/083166, filed on Sep. 10, 2013, which claims priority to Chinese Patent Application No. 201210568135.9, filed on Dec. 24, 2012, both of which are hereby incorporated by reference in their entireties.

TECHNICAL FIELD

The present invention relates to the field of communications technologies, and in particular, to an information processing method and apparatus for video communication.

BACKGROUND

With today's rapid development of computer and network technologies, traditional communication manners such as telephoning and faxing cannot meet people's ever-increasing communication demands because the traditional communication manners cannot achieve a face-to-face communication effect, and an increasingly developed network environment makes video and audio transmission possible. Therefore, a new communications manner, namely, video communication, emerges.

A video communication system refers to a communication manner in which multiple types of data such as a static image, a dynamic image, and a voice of a person, and text are delivered to computers of users by using existing electrical communication transmission media, so as to transfer audios and images in real time. By means of video communication, geographically dispersed users may be connected together in a network to present an opinion through a television, observe a counterpart's image, action, expression, and the like, and show an actually shot television image such as a material matter, a drawing and a file, or display text and pictures that are written and drawn on a blackboard and a whiteboard, which enables a conference participant to feel like communicating "face to face" with a counterpart on site, increases two parties' understanding of content, and may achieve an effect that is the same as a conference held on site.

With the development of a modern society, video communication becomes an increasingly important means in work communication and tele-education. In addition, the video communication system attracts more and more organizations and individuals to perform more effective communication by using the video communication system.

A common video communication system does not make full use of initialization information of video communication and information of a video communication process, which cannot effectively improve a video communication effect.

SUMMARY

This application provides implementation manners of an information processing method and apparatus for video communication, which can make full use of initialization information of video communication and information of a video communication process, thereby effectively improving a video communication effect.

According to a first aspect, an information processing method for video communication is provided, including identifying each participant in current video communication, and allocating a unique participant identity and a role identifier to each participant in the current video communication; acquiring initialization information of the current video communication and collecting information of a current video communication process; obtaining, by means of search according to an association relationship between a role identifier of a participant in the current video communication and a preset policy, the preset policy corresponding to the participant in the current video communication; summarizing the initialization information and the information of the current video communication process by using the obtained preset policy, to obtain evaluation information that is of the participant in the current video communication and that is about the current video communication; and sending, to the participant in the current video communication, the obtained evaluation information that is of the participant in the current video communication and that is about the current video communication.

With reference to the first aspect, in a first possible implementation manner, the step of the collecting information of a current video communication process includes, when detecting, by using a face tracking technology, that a face of a first participant is absent in an image, searching for the face of the first participant to acquire a first participant identity, and recording the first participant identity and time when the first participant whose face is absent in the image leaves a conference site.

With reference to the first possible implementation manner of the first aspect, in a second possible implementation manner, the step of the collecting information of a current video communication process further includes, when detecting, by using the face tracking technology, that a new face appears, determining, by means of search, whether the new face matches the recorded first participant identity; and if yes, recording time when the first participant returns to the conference site; if not, allocating a participant identity to the new face and recording time when the new face enters the conference site.

With reference to the first possible implementation manner of the first aspect, in a third possible implementation manner, the step of the collecting information of a current video communication process includes, when detecting, by using the face tracking technology, that a quantity of faces in the image is less than a preset numerical value, recording current time as start time of a break; and when detecting, by using the face tracking technology, that the quantity of faces in the image reaches the preset numerical value again, recording current time as end time of the break.

With reference to the first aspect, in a fourth possible implementation manner, the step of the collecting information of a current video communication process includes detecting, by using a face tracking technology, a face of a second participant; further detecting, by using an expression identification technology, whether the face of the second participant is in a dozing state; if yes, searching out a second participant identity according to the face of the second participant who dozes off; and recording the second participant identity as well as start time and end time of the dozing state.

With reference to the first aspect, in a fifth possible implementation manner, the step of the collecting information of a current video communication process includes, when detecting, by using a voice identification technology, a voice of a third participant, searching out a third participant identity according to the voice of the third participant, and recording the third participant identity and time when the third participant starts speaking.

With reference to the fifth possible implementation manner of the first aspect, in a sixth possible implementation manner, the step of the collecting information of a current video communication process further includes, when detecting, by using the voice identification technology, that the voice of the third participant ends, recording time when the third participant finishes speaking, and detecting volume of a conference site at current time.

With reference to the sixth possible implementation manner of the first aspect, in a seventh possible implementation manner, after the step of detecting volume of a conference site at current time, the method further includes, when the volume of the conference site is lower than a first preset threshold, recording a speaking effect of the third participant as fair; when the volume of the conference site is higher than the first preset threshold but is lower than a second preset threshold, recording the speaking effect of the third participant as good; and when the volume of the conference site is higher than the second preset threshold, recording the speaking effect of the third participant as excellent, where the second threshold is greater than the first threshold.

With reference to the fifth possible implementation manner of the first aspect, in an eighth possible implementation manner, the step of the collecting information of a current video communication process further includes, when detecting, for the first time, that the third participant speaks, initializing a quantity of speaking times of the third participant as 1; otherwise, increasing the quantity of speaking times of the third participant by 1.

With reference to the first aspect, in a ninth possible implementation manner, the step of the acquiring initialization information of the current video communication includes acquiring, by initializing a current video communication system, the initialization information of the current video communication, including at least a quantity of conference sites, information about a quantity of expected attendees in each conference site, information about a quantity of actually present attendees in each conference site, information about a quantity of absent attendees in each conference site, information about start time of the current video communication, information about initial time when each participant of the current video communication is present, and information of each participant.

With reference to the first aspect, in a tenth possible implementation manner, the sending, to the participant in the current video communication, the obtained evaluation information that is of the participant in the current video communication and that is about the current video communication includes sending, to the participant in the current video communication by using at least one of a mobile terminal, an email, and an instant messaging tool, the obtained evaluation information that is of the participant in the current video communication and that is about the current video communication.

With reference to the first aspect, in an eleventh possible implementation manner, the allocating a unique participant identity and a role identifier to each participant in the current video communication includes allocating, to each participant in the current video communication, the unique participant identity and at least one role identifier of a moderator, a presenter, an assistant, an administrator, and a common participant.

With reference to the eleventh possible implementation manner of the first aspect, in a twelfth possible implementation manner, the step of the summarizing the initialization information and the information of the current video communication process by using the obtained preset policy, to obtain evaluation information that is of the participant in the current video communication and that is about the current video communication includes at least one of the following operations of acquiring video communication evaluation information: summarizing the initialization information and the information of the current video communication process by using an obtained preset policy of the moderator/presenter, to obtain the video communication evaluation information, including at least overall information of the current video communication, information about overall performance of each participant, a subject of the video communication, and information about an interested subject; summarizing the initialization information and the information of the current video communication process by using an obtained preset policy of the assistant, to obtain the video communication evaluation information, including at least real-time video communication information, overall video communication information, information about overall performance of each participant, a subject of the video communication, and information about an interested subject; summarizing the initialization information and the information of the current video communication process by using an obtained preset policy of the common participant, to obtain the video communication evaluation information, including at least overall information of the current video communication and information of overall performance of the common participant; and summarizing the initialization information and the information of the current video communication process by using an obtained preset policy of the administrator, to obtain the video communication evaluation information, including at least attendance rate information of a conference site.

According to a second aspect, an information processing apparatus for video communication is provided, including an allocating module, an acquiring module, a searching module, a processing module, and a sending module. The allocating module is configured to identify each participant in current video communication, and allocate a unique participant identity and a role identifier to each participant in the current video communication. The acquiring module is configured to acquire initialization information of the current video communication, collect information of a current video communication process, and send the initialization information of the current video communication and the information of the current video communication process to the processing module. The searching module is configured to obtain, by means of search according to an association relationship between a role identifier of a participant in the current video communication and a preset policy, the preset policy corresponding to the participant in the current video communication; and send the preset policy to the processing module. The processing module is configured to summarize the initialization information and the information of the current video communication process by using the obtained preset policy, to obtain evaluation information that is of the participant in the current video communication and that is about the current video communication, and send, to the sending module, the evaluation information that is of the participant in the current video communication and that is about the current video communication. The sending module is configured to send, to the participant in the current video communication, the obtained evaluation information that is of the participant in the current video communication and that is about the current video communication.

With reference to the second aspect, in a first possible implementation manner, the acquiring module is configured to, when detecting, by using a face tracking technology, that a face of a first participant is absent in an image, search for the face of the first participant to acquire a first participant identity, and record the first participant identity and time when the first participant whose face is absent in the image leaves a conference site.

With reference to the first possible implementation manner of the second aspect, in a second possible implementation manner, the acquiring module is further configured to, when detecting, by using the face tracking technology, that a new face appears, determine whether the new face matches the recorded first participant identity; and if yes, record time when the first participant returns to the conference site; if not, instruct the allocating module to allocate a participant identity to the new face, and record time when the new face enters the conference site.

With reference to the first possible implementation manner of the second aspect, in a third possible implementation manner, the acquiring module is further configured to, when detecting, by using the face tracking technology, that a quantity of faces in the image is less than a preset numerical value, record current time as start time of a break; and when detecting, by using the face tracking technology, that the quantity of faces in the image reaches the preset numerical value again, record current time as end time of the break.

With reference to the second aspect, in a fourth possible implementation manner, the acquiring module is configured to detect, by using a face tracking technology, a face of a second participant; further detect, by using an expression identification technology, whether the face of the second participant is in a dozing state; if yes, search out a corresponding second participant identity according to the face of the second participant who dozes off; and record the second participant identity as well as start time and end time of the dozing state.

With reference to the second aspect, in a fifth possible implementation manner, the acquiring module is configured to, when detecting, by using a voice identification technology, a voice of a third participant, search out a third participant identity according to the voice of the third participant, and record the third participant identity and time when the third participant starts speaking.

With reference to the fifth possible implementation manner of the second aspect, in a sixth possible implementation manner, the acquiring module is further configured to, when detecting, by using the voice identification technology, that the voice of the third participant ends, record time when the third participant finishes speaking, and detect volume of a conference site at current time.

With reference to the sixth possible implementation manner of the second aspect, in a seventh possible implementation manner, the acquiring module is further configured to, when the volume of the conference site is lower than a first preset threshold, record a speaking effect of the third participant as fair; when the volume of the conference site is higher than the first preset threshold but is lower than a second preset threshold, record the speaking effect of the third participant as good; and when the volume of the conference site is higher than the second preset threshold, record the speaking effect of the third participant as excellent, where the second threshold is greater than the first threshold.

With reference to the fifth possible implementation manner of the second aspect, in an eighth possible implementation manner, the acquiring module is further configured to, when detecting, for the first time, that the third participant speaks, initialize a quantity of speaking times of the third participant as 1; otherwise, increase a quantity of speaking times of the third participant by 1.

With reference to the second aspect, in a ninth possible implementation manner, the acquiring module is configured to acquire, by initializing a current video communication system, the initialization information of the current video communication, including at least a quantity of conference sites, information about a quantity of expected attendees in each conference site, information about a quantity of actually present attendees in each conference site, information about a quantity of absent attendees in each conference site, information about start time of the current video communication, information about initial time when each participant of the current video communication is present, and information of each participant.

With reference to the second aspect, in a tenth possible implementation manner, the sending module is configured to send, to the participant in the current video communication by using at least one of a mobile terminal, an email, and an instant messaging tool, the obtained evaluation information that is of the participant in the current video communication and that is about the current video communication.

With reference to the second aspect, in an eleventh possible implementation manner, the allocating module is configured to identify each participant in the current video communication, and allocate, to each participant in the current video communication, the unique participant identity and at least one role identifier of a moderator, a presenter, an assistant, an administrator, and a common participant.

With reference to the eleventh possible implementation manner of the second aspect, in a twelfth possible implementation manner, the processing module is configured to perform at least one of the following operations of summarizing the initialization information and the information of the current video communication process by using the obtained preset policy, to obtain video communication evaluation information: summarizing the initialization information and the information of the current video communication process by using an obtained preset policy of the moderator/presenter, to obtain the video communication evaluation information, including at least overall information of the current video communication, information about overall performance of each participant, a subject of the video communication, and information about an interested subject; summarizing the initialization information and the information of the current video communication process by using an obtained preset policy of the assistant, to obtain the video communication evaluation information, including at least real-time video communication information, overall video communication information, information about overall performance of each participant, a subject of the video communication, and information about an interested subject; summarizing the initialization information and the information of the current video communication process by using an obtained preset policy of the common participant, to obtain the video communication evaluation information, including at least overall information of the current video communication and information of overall performance of the common participant; and summarizing the initialization information and the information of the current video communication process by using an obtained preset policy of the administrator, to obtain the video communication evaluation information, including at least attendance rate information of a conference site.

In the information processing method for video communication provided in the implementation manners of this application, a preset policy corresponding to a participant in current video communication is obtained by means of search according to an association relationship between a role identifier of the participant in the current video communication and the preset policy, and initialization information and information of the current video communication process are summarized by using the preset policy, to obtain evaluation information that is of the participant in the current video communication and that is about the current video communication. In this manner, initialization information of video communication and information of a video communication process can be fully used, and information is processed by using a preset policy with reference to roles of different participants, so as to obtain different video communication evaluation information for different roles. Therefore, a participant can obtain video communication evaluation information corresponding to a role of the participant, which not only saves the participant's time of reading video communication evaluation data, but also can obtain video communication evaluation data helpful to the participant, thereby effectively improving a video communication effect.

BRIEF DESCRIPTION OF THE DRAWINGS

To describe the technical solutions in the embodiments of this application more clearly, the following briefly introduces the accompanying drawings required for describing the embodiments. The accompanying drawings in the following description show some embodiments of this application, and a person of ordinary skill in the art may still derive other drawings from these accompanying drawings without creative efforts.

DETAILED DESCRIPTION

To make the objectives, technical solutions, and advantages of the embodiments of this application clearer, the following clearly describes the technical solutions in the embodiments of this application with reference to the accompanying drawings in the embodiments of this application. The described embodiments are merely a part rather than all of the embodiments of this application. All other embodiments obtained by a person of ordinary skill in the art based on the embodiments of this application without creative efforts shall fall within the protection scope of this application.

Figure 1:
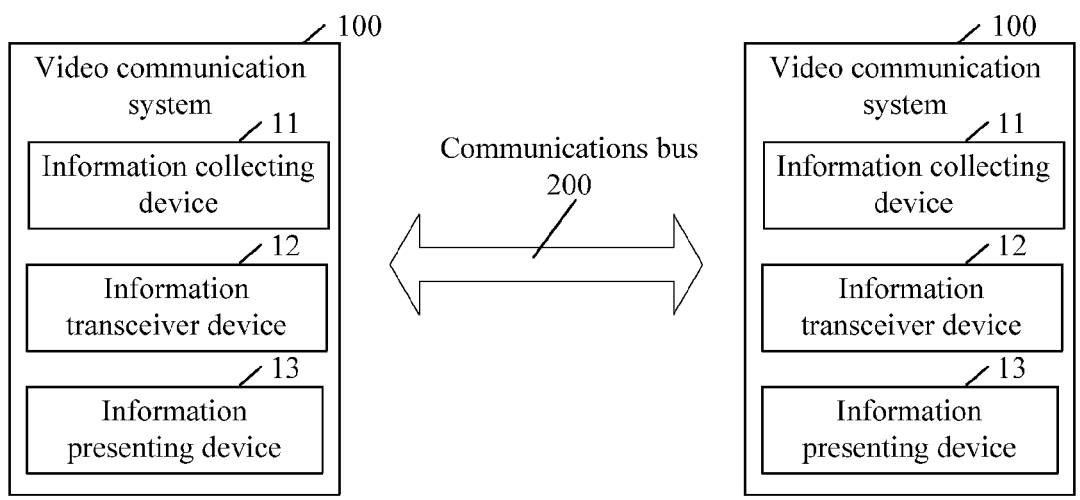
FIG. 1 is a schematic diagram of an application scenario of an information processing method for video communication according to this application.
Figure 2:
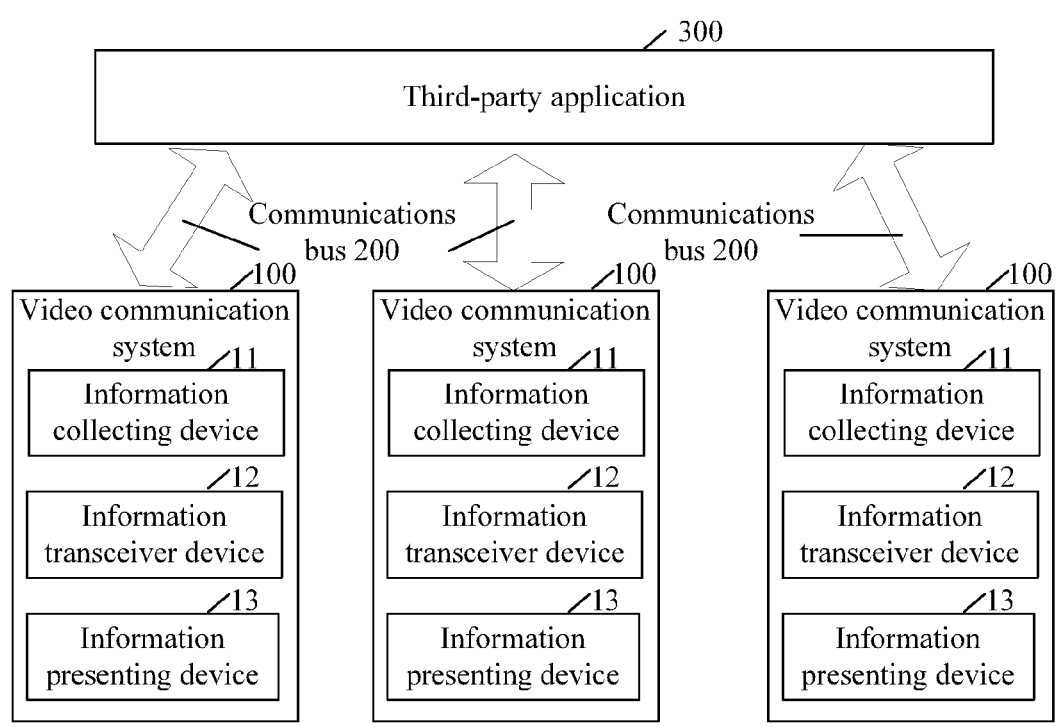
FIG. 2 is a schematic diagram of another application scenario of an information processing method for video communication according to this application.

An information processing method for video communication in this application may be implemented on a video communication system. Referring to FIG. 1 and FIG. 2, FIG. 1 and FIG. 2 are application scenarios of an information processing method for video communication in this application. FIG. 1 is an application scenario of point-to-point video communication, where video communication systems 100 implement communication by using a communications bus 200. FIG. 2 is an application scenario of multipoint video communication, where multiple video communication systems 100 implement communication with a shared third-party application 300 by using a communications bus 200.

The video communication system 100 may include an information collecting device 11, an information transceiver device 12, and an information presenting device 13.

The information collecting device 11 is configured to collect a voice, image information, and the like of a video communication process, and may be any information collecting device such as a camera or a microphone in the prior art.

The information transceiver device 12 is configured to receive and send information of the video communication process, and may be any terminal device capable of receiving and sending information in the prior art.

The information presenting device 13 is configured to present the voice, the image information, text information, and the like of the video communication process, and may be a display, a conference control touchscreen, or a networked personal terminal such as a mobile phone and a Pad.

The third-party application 300 may be a server, a media gateway device, a micro control unit device (MCU), or the like.

Figure 3:
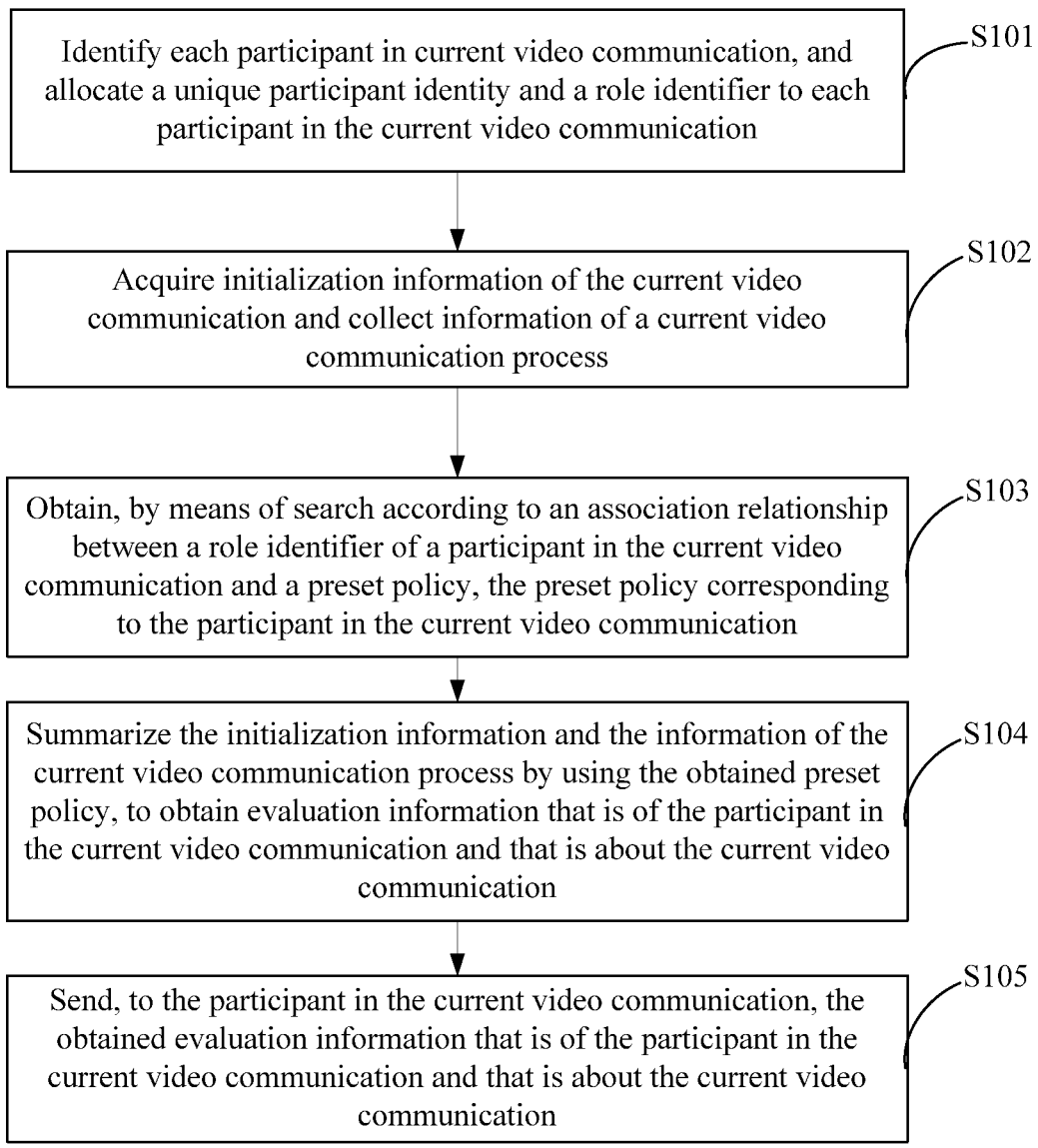
FIG. 3 is a flowchart of an information processing method for video communication according to an implementation manner of this application.

Referring to FIG. 3, an implementation manner of an information processing method for video communication in this application includes the following.

Step S101: Identify each participant in current video communication, and allocate a unique participant identity and a role identifier to each participant in the current video communication.

Each video communication participant is automatically identified. For example, the video communication participant may be identified by means of fingerprint identification, retina identification, video analysis, or voice identification. Moreover, a unique participant identity such as an identification (ID) number is allocated to each video communication participant, and a role identifier is allocated to each video communication participant, where the role identifier may include a moderator, a presenter, an assistant, an administrator, and a common participant. Generally, one video communication participant has only one role identifier, and certainly, may also have two or more role identifiers at the same time according to a requirement.

In the implementation manner of this application, the moderator is a main administrator and main speaker in the video communication. In the video communication, the moderator may allocate a role, manage permission, set a video communication parameter, share a document, and enable a participant to perform switching according to content of the moderator The presenter is a main speaker of the video communication and may switch a video interface in the video communication process. The presenter may speak, share a document, and enable a participant to perform switching according to content of the presenter. The assistant is an assistant in the video communication. In the video communication process, the assistant may assist in calling a roll, creating a vote, making a questionnaire, allocating permission, managing a document, and the like. The common participant is a main participant in the video communication. The moderator or the assistant may allocate permission or a role to a participant in the video communication, so as to enable the participant to exchange voice and data. The administrator is responsible for various management work of a conference site of the video communication.

In current video communication, these roles are generally configured on a management interface or by using a configuration file. Alternatively, there is also a case in which a video analysis technology is used to perform automatic identification, for example, teacher and student roles are automatically identified according to walking time in video teaching. However, the video analysis technology is closely related to a specific application scenario and is not ideal in terms of universality.

Step S102: Acquire initialization information of the current video communication and collect information of a current video communication process.

The initialization information of the current video communication is acquired by initializing a current video communication system. The initialization information of the video communication includes but is not limited to information about a quantity of conference sites, for example, there are three conference sites in the current video communication; information about a quantity of expected attendees in each conference site, for example, three persons are expected in each conference site; information about a quantity of actually present attendees in each conference site, for example, the quantity of actually present attendees in conference sites A, B, and C is 2, 2, and 1, respectively; information about an absent person, for example, Wang in conference site A, Ding in conference site B, and Zhang and Li in conference site C are absent; start time of the current video communication, for example, the start time of the current video communication is 9:30; information about initial time when each participant of the current video communication is present, for example, time when a participant initially enters a conference site before the start time of the video communication may be set as the start time of the video communication, and time when a participant initially enters a conference site after the start time of the video communication may be set as time when the participant actually enters the conference site; and information of each participant, for example, contact information of a participant, which may include a mobile phone number, a QQ number, a Wechat number, an email address, and the like of the participant.

The initialization information of the video communication is output to relevant personnel such as a secretary or presenter of the video communication in real time, so that the relevant personnel may take a corresponding action according to an actual condition. For example, the secretary may instruct in time absent personnel to enter a conference site in time, the presenter may also delay the start time of the video communication properly in a case in which many participants are absent, or the like.

The information of the video communication process is acquired by means of combining audio and video technologies. For example, information of a video communication site is acquired in real time by means of combining a face identification and tracking technology and a voice identification technology. The information of the video communication process includes but is not limited to real-time information during the video communication, for example, information about a conference site condition, participant status information, and video communication status information.

The conference site condition includes but is not limited to, break information of the video communication, for example, there are two breaks in the current video communication, 15 minutes for each break; information about a person who leaves a conference site and absence time information in the video communication, for example, Wang in conference site A leaves for 20 minutes in the video communication; and information of a person who enters the conference site midway and entrance time, for example, Zhang enters conference site C midway in the video communication. Certainly, in order to record more detailed information, a specific time point may be further included, for example, Zhang enters conference site C at 15:43.

The participant status information includes but is not limited to, status information when a participant lacks concentration, including status information when the participant is performing discussion, lowers his/her head, dozes off, and plays with a mobile phone, for example, Li in conference site B dozes off for half an hour; information about a quantity of speaking times of a participant and speaking duration, for example, Zhang in conference site C speaks for three times, two minutes for each time of speaking and six minutes in total; and reaction information of another participant after each time of speaking, for example, two times of speaking by Zhang in conference site C gain applause.

Step S103: Obtain, by means of search according to an association relationship between a role identifier of a participant in the current video communication and a preset policy, the preset policy corresponding to the participant in the current video communication.

Generally, each video communication participant focuses on different video communication-related information due to a different role. For example, a conference site administrator focuses on a conference site attendance rate, but is not interested in participants' information. For example, participant A is concerned with his/her own video communication attendance rate and performance information, but is not interested in relevant information of participant B, and is unwilling to let another participant learn about his/her own video communication information. Therefore, it may be set that different role identifiers correspond to different policies of processing video communication information.

According to the role identifier of the participant in the current video communication, the preset policy corresponding to the participant in the current video communication may be obtained by means of search.

Step S104: Summarize the initialization information and the information of the current video communication process by using the obtained preset policy, to obtain evaluation information that is of the participant in the current video communication and that is about the current video communication.

The initialization information and the information of the current video communication process are summarized by using the obtained preset policy, to obtain video communication evaluation information for different roles of video communication participants. In this implementation manner, for content included in video communication evaluation information corresponding to different role identifiers, reference may be made to Table 1.

The video communication evaluation information includes but is not limited to at least one of the following video communication evaluation information: video communication evaluation information that is suitable for a video communication assistant to view and includes at least real-time video communication information, overall video communication information, information about overall performance of each participant, a subject of the video communication, and information about an interested subject, for example, there are three conference sites (A, B, and C) in the current video communication, three persons are expected in each conference site, the quantity of actually present attendees in each conference site is 2, and one person is absent in each conference site; actual duration of the current video communication is 2 hours, with a break of 0.5 hours; attendance rates of conference site A, conference site B, and conference site C are 100%, 100%, and 66.7% respectively; presence time of Wang in conference site A is 2 hours, with effective presence time of 1.5 hours (the effective presence time is obtained by subtracting time in a case of lack of concentration from total presence time), and presence time/effective presence time of another person is 2 hours; presence time of Li in conference site B is 2 hours, with effective presence time of 1.5 hours, and presence time/effective presence time of another person is 2 hours; presence time/effective presence time of 2 persons in conference site C are 2 hours each; and "technical solution" and "product prospect" are relatively interested subjects, where the assistant may report such video communication evaluation information to a leader in an oral or written form;

video communication evaluation information that is suitable for a common video communication participant to view and includes at least overall information of the current video communication and information of a common participant's own overall performance, for example, video communication evaluation information for a common participant Wang may include the current video communication lasts 2.5 hours, with an effective duration of 2 hours and a break of 0.5 hours; Wang dozes off for 0.5 hours; Wang speaks for 8 times and content corresponding to each speak; Wang wins applause for six times; there is a heated discussion about "technical solution"; and "product prospect" gains most laughter and applause; video communication evaluation information that is suitable for a presenter/moderator of the video communication to view and includes at least overall information of the current video communication, information about overall performance of each participant, a subject of the video communication, and information about an interested subject, for example, a participant attendance rate of the current video communication is high; one person enters conference site B midway; Wang in conference site A leaves the conference site for 0.5 hours; Li in conference site B dozes off for 0.5 hours; Zhang in conference site C actively speaks and gains agreement after speaking; there is a very heated discussion about "technical solution"; and "technical solution" and "product prospect" are relatively interested subjects; and video communication evaluation information that is suitable for an administrator to view and includes at least attendance rate information of a conference site, for example, attendance rates of conference site A, conference site B, and conference site C in the current video communication are 100%, 100%, and 66.7% respectively.

The foregoing is merely an example of generating different corresponding video communication evaluation information according to different video communication roles in this implementation manner. In an actual application process, a policy may be set according to a requirement, so that content included in the generated video communication evaluation information corresponding to each role can meet an actual requirement of a video communication participant.

Step S105: Send, to the participant in the current video communication, the obtained evaluation information that is of the participant in the current video communication and that is about the current video communication.

The obtained evaluation information that is of the participant in the current video communication and that is about the current video communication is sent to the participant in the current video communication by using at least one of a mobile terminal (such as a mobile phone and a Pad), an email, and an instant messaging tool (such as QQ and Microsoft Network (MSN)).

The video communication participant may view the video communication evaluation information (including video communication evaluation information in any form of a text/an image/a video/a voice, or the like) by using a conference control touchscreen, a mobile terminal such as a mobile phone, an email box, or the like. For details, reference may be made to Table 1.

TABLE 1

Content of video communication evaluation information corresponding to different roles and presentation manner

| Conference role | Content of video communication evaluation information | Presentation manner |
| --- | --- | --- |
| Moderator | 1) The foregoing overall information of the current conference<br>2) Overall performance of each participant<br>3) Statistics about subjects of the conference and statistics information of interested subjects, which are acquired by using an information mining module | Presented on respective conference control touchscreen in a text/image/video manner<br>Presented on respective personal terminal in a text/image/video/voice manner<br>Presented in respective email box in a text/image/video/voice manner |
| Presenter | 1) The foregoing overall information of the current conference<br>2) Overall performance of each participant<br>3) Statistics about subjects of the conference and statistics information of interested subjects, which are acquired by using an information mining module | Presented on respective conference control touchscreen in a text/image/video manner<br>Presented on respective personal terminal in a text/image/video/voice manner<br>Presented in respective email box in a text/image/video/voice manner |
| Assistant | 1) Real-time information during a conference<br>2) The foregoing overall information of the current conference<br>3) Overall performance of each participant<br>4) Statistics about subjects of the conference and statistics information of interested subjects, which are acquired by using an information mining module | Presented on respective conference control touchscreen in a text/image/video manner<br>Presented on respective personal terminal in a text/image/video/voice manner<br>Presented in respective email box in a text/image/video/voice manner |

TABLE 1-continued

Content of video communication evaluation information corresponding to different roles and presentation manner

| Conference role | Content of video communication evaluation information | Presentation manner |
|---|---|---|
| Participant | 1) The foregoing overall information of the current conference<br>2) Information of one's own overall performance of the current conference | Presented on respective conference control touchscreen in a text/image/video manner<br>Presented on respective personal terminal in a text/image/video/voice manner<br>Presented in respective email box in a text/image/video/voice manner |
| Administrator | Attendance rate of a conference site | Presented on a display device of a management server<br>Presented on respective personal terminal in a text/image/video/voice manner<br>Presented in respective email box in a text/image/video/voice manner |

Based on the foregoing obtained video communication evaluation information, summarization may be further performed comprehensively with reference to historical video communication information, to explore some new policies, including policies for selecting a video communication conference site, a video communication-relevant topic, adjustment and improvement of a video communication mode, and the like. For example, attendance rates of conference site A, conference site B, and conference site C in the current video communication are 100%, 100%, and 66.7% respectively, and historical average attendance rates of conference site A, conference site B, and conference site C in historical video communication are 80% (10 times), 60% (8 times), and 40% (6 times) respectively. It is obtained, by means of summarization, that current average attendance rates of conference site A, conference site B, and conference site C are 81.8%, 64.4%, and 43.8% respectively. It may be seen that the attendance rate of conference site C is the lowest. Therefore, a new policy is explored. If conference site C is applied for next video communication, a relatively small site may be allocated. For another example, a participant attendance rate of the current video communication is high, a participant actively speaks, conference site atmosphere is relatively active, and a discussion is also very heated in the video communication; and a participant attendance rate of historical video communication having a same topic is relatively high, a participant actively performs discussion and speaks. Therefore, a new policy is explored. A quantity of video communication similar to the topic may be increased accordingly, and the like.

It should be understood that the video communication described in this application includes any activity that is performed in a video form and has at least two participants, for example, includes but is not limited to a videoconference, tele-education, or the like.

In the implementation manner of the foregoing information processing method for video communication, a preset policy corresponding to a participant in current video communication is obtained by means of search according to an association relationship between a role identifier of the participant in the current video communication and the preset policy, and initialization information and information of the current video communication process are summarized by using the preset policy, to obtain evaluation information that is of the participant in the current video communication and that is about the current video communication. In this manner, initialization information of video communication and information of a video communication process can be fully used, and information is processed by using a preset policy with reference to roles of different participants, so as to obtain different video communication evaluation information for different roles. Therefore, a participant can obtain video communication evaluation information corresponding to a role of the participant, which not only saves the participant's time of reading video communication evaluation data, but also can obtain video communication evaluation data helpful to the participant, thereby effectively improving a video communication effect.

In addition, collected information and the obtained video communication evaluation information are further saved and are summarized comprehensively with reference to historical video communication information, so as to explore a corresponding new video communication adjustment or improvement policy for reference and decision of relevant personnel, which provides help for the relevant personnel in planning of next video communication.

Figure 4:
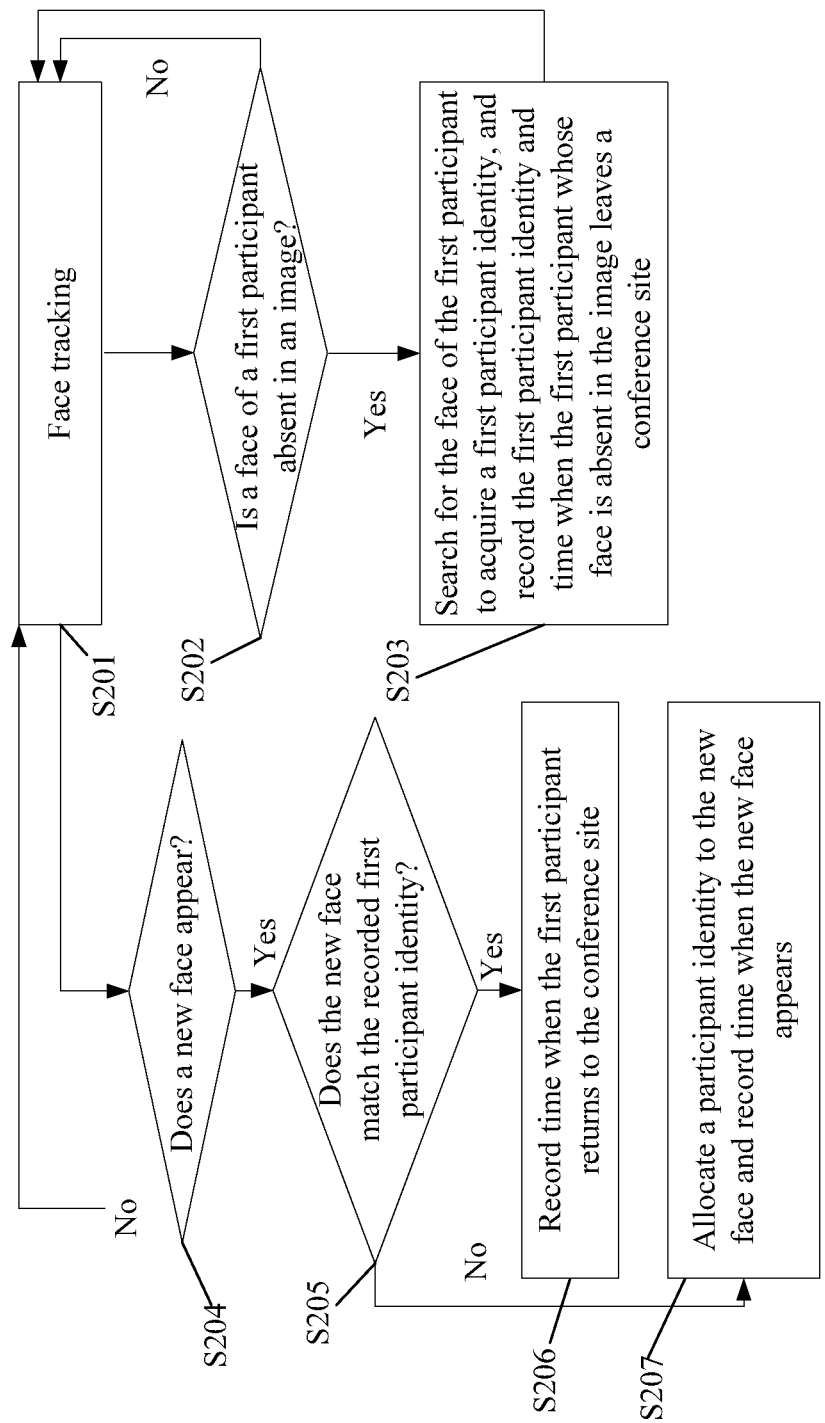
FIG. 4 is a flowchart of collecting information of a video communication process in an information processing method for video communication according to an implementation manner of this application.

Referring to FIG. 4, FIG. 4 is a flowchart of collecting information of a video communication process in an implementation manner of an information processing method for video communication according to this application, where the method includes the following.

Step S201: Perform face tracking.

Real-time information of a video communication process is acquired by using a face tracking technology.

Step S202: Determine whether a face of a first participant is absent in an image.

According to the information detected by using the face tracking technology, it is determined whether the face of the first participant is absent in the image, where the first participant may be any one of all participants in video communication. If the face of the first participant is absent in the image, perform step S203; otherwise, return to step S201 to perform face tracking.

Step S203: Search for the face of the first participant to acquire a first participant identity, and record the first participant identity and time when the first participant whose face is absent in the image leaves a conference site.

When it is detected by using the face tracking technology that the face of the first participant is absent in the image, it is determined that the first participant leaves the conference site. The face of the first participant is searched for, to acquire the first participant identity, and the first participant identity and the time when the first participant leaves the conference site (that is, time when it is initially detected that the face of the first participant is absent in the image) are recorded.

Step S204: Determine whether a new face appears.

According to a detection result obtained by using the face tracking technology, it is determined whether the new face appears. If the new face appears, further perform step S205; otherwise, return to step S201 to perform face tracking.

Step S205: Determine whether the new face matches the recorded first participant identity.

When it is detected by using the face tracking technology that the new face appears, it is determined whether the new face matches the first participant identity that has been recorded. If yes, perform step S206; otherwise, perform step S207.

Step S206: Record time when the first participant returns to the conference site.

When the detected new face matches the first participant identity that has been recorded, it is determined that the first participant returns to the conference site. The time when the first participant returns to the conference site (that is, time when the new face is detected) is recorded.

Duration in which the first participant is absent from the conference site is calculated according to the following formula: $T_l = T_b - T_a$, where $T_l$ is duration of absence from a conference site; $T_b$ is time of returning to the conference site; and $T_a$ is time of leaving the conference site.

If the face of the first participant is still not detected till the video communication ends, the time when the first participant leaves the conference site is set as end time $PT_e$ of the participant in the current video communication.

Step S207: Allocate a participant identity to the new face and record time when the new face enters the conference site.

When the detected new face does not match the first participant identity that has been recorded, it is determined that a new participant joins midway. The participant identity is allocated to the new face, and the time when the person enters the conference site (that is, the time when the new face is detected) is recorded. In addition, a quantity of actually present attendees of the conference site increases by 1. Moreover, the time is initialized as start time $PT_s$ of the participant.

Figure 5:
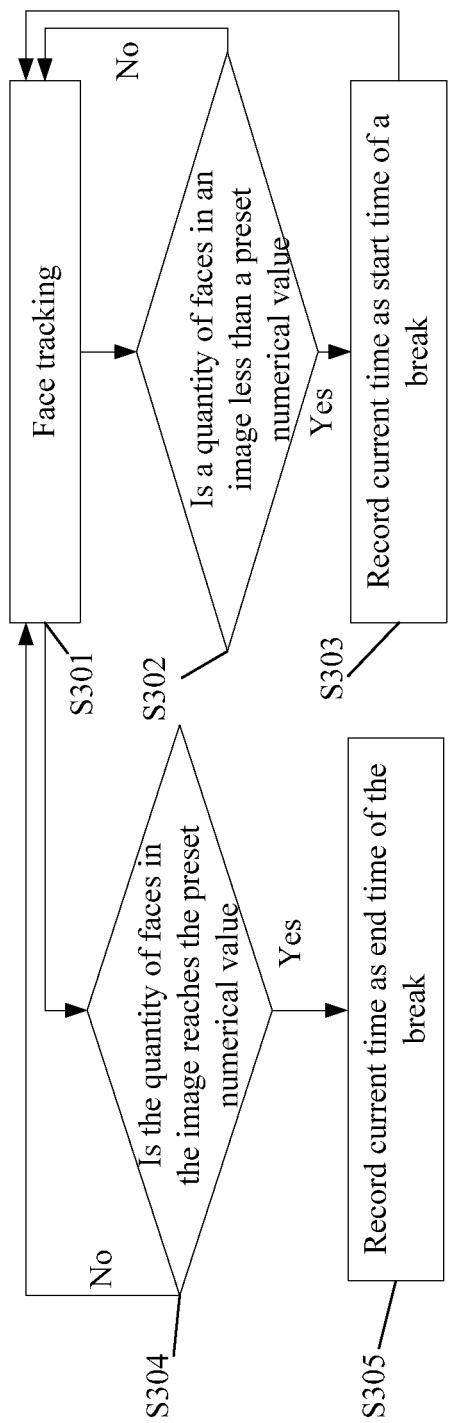
FIG. 5 is a flowchart of collecting information of a video communication process in an information processing method for video communication according to an implementation manner of this application.

Referring to FIG. 5, FIG. 5 is a flowchart of collecting information of a video communication process in an implementation manner of an information processing method for video communication according to this application, where the method includes the following.

Step S301: Perform face tracking.

A condition of a video communication site is detected in real time by using a face tracking technology.

Step S302: Determine whether a quantity of faces in an image is less than a preset numerical value.

According to a detection result obtained by using the face tracking technology, it is determined whether the quantity of faces detected in the image is less than the preset numerical value. The preset numerical value herein may be set according to an actual condition of video communication, and may be half, 70%, or another percentage of a quantity of all participants. For example, if there are a total of 100 participants in the video communication, the preset numerical value may be set to 50 or another numerical value, and is used to determine whether a break starts. When the quantity of faces in the image is less than the preset numerical value, it is determined that the break starts, and perform step S303; otherwise, return to step S301 to perform face tracking.

Step S303: Record current time as start time of a break.

When the quantity of faces in the image is less than the preset numerical value, it indicates that the break starts. In this case, the current time is recorded as the start time of the break. Return to step S301 to perform face tracking.

Step S304: Determine whether the quantity of faces in the image reaches a preset numerical value.

According to a detection result obtained by using the face tracking technology, it is determined whether the quantity of faces in the image reaches the preset numerical value. If the quantity of faces in the image reaches the preset numerical value, it is determined that the break ends, and further perform step S305; otherwise, return to step S301 to perform face tracking.

Step S305: Record current time as end time of the break.

When the quantity of faces in the image reaches the preset numerical value, it indicates that the break ends. In this case, the current time is recorded as the end time of the break.

Duration of the break is calculated according to the following formula: $HT_l = HT_b - HT_a$, where $HT_l$ is duration of the break; $HT_b$ is end time of the break; and $HT_a$ is start time of the break.

Based on the foregoing face detection by using the face tracking technology, an expression identification technology may be further used to detect whether a participant dozes off. For example, if a face of a second participant is detected, it is further detected according to the expression identification technology whether the face of the second participant is in a dozing state; and if yes, a second participant identity is searched for according to the face of the second participant who dozes off, and the second participant identity as well as start time and end time of the dozing state are recorded. The second participant may be any one of all video communication participants.

Duration of the dozing state is calculated according to the following formula: $DT_l = DT_b - DT_a$, where $DT_l$ is duration of the dozing state; $DT_b$ is end time of the dozing state; and $DT_a$ is start time of the dozing state.

Figure 6:
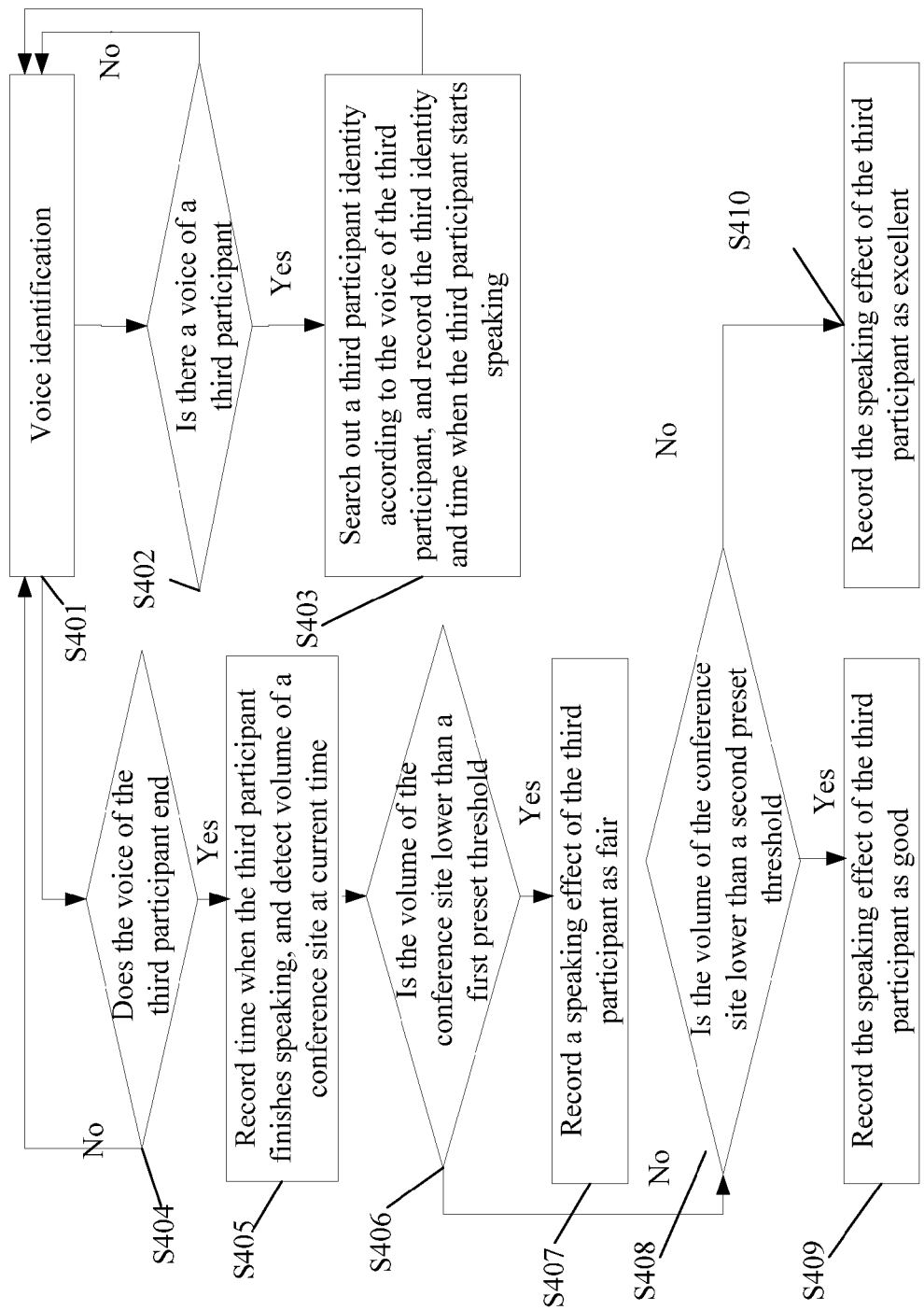
FIG. 6 is a flowchart of collecting information of a video communication process in an information processing method for video communication according to an implementation manner of this application.

Referring to FIG. 6, FIG. 6 is a flowchart of collecting information of a video communication process in an implementation manner of an information processing method for video communication according to this application, where the method includes the following.

Step S401: Perform voice identification.

Voice information of a video communication site is detected in real time by using a voice identification technology.

Step S402: Determine whether there is a voice of a third participant.

According to a detection result obtained by using the voice identification technology, it is determined whether there is the voice of the third participant. If the voice of the third participant is detected, perform step S403; otherwise, return to step S401 to perform voice identification. The third participant may be any one of all video communication participants.

Step S403: Search out a third participant identity according to the voice of the third participant, and record the third participant identity and time when the third participant starts speaking.

If the voice of the third participant is detected, it indicates that the third participant speaks. In this case, the third participant identity is searched out according to the voice of the third participant, and the third participant identity and the time when the third participant starts speaking are recorded.

Step S404: Determine whether the voice of the third participant ends.

According to a detection result of voice identification, it is determined whether the voice of the third participant ends. If yes, perform step S405; otherwise, return to step S401 to perform voice identification.

Step S405: Record time when the third participant finishes speaking, and detect volume of a conference site at current time.

When it is detected by means of voice identification that the voice of the third participant ends, the time when the third participant finishes speaking is recorded, and the volume of the conference site at the current time is detected, where the volume of the conference site is used as reference for evaluating a speaking effect of the third participant.

When speaking by the third participant is detected for the first time, a quantity of speaking times of the third participant is initialized as 1; otherwise, the quantity of speaking times of the third participant increases by 1.

Step S406: Determine whether the volume of the conference site is lower than a first preset threshold.

According to the detected volume of the conference site at the current time, it is determined whether the volume of the conference site is lower than the first preset threshold. If yes, perform step S407; otherwise, perform step S408.

Step S407: Record a speaking effect of the third participant as fair.

When the volume of the conference site is lower than the first preset threshold, it is determined that reaction brought by speaking of the third participant is fair. In this case, the speaking effect of the third participant is recorded as fair.

Step S408: Determine whether the volume of the conference site is lower than a second preset threshold.

When the volume of the conference site is not lower than the first preset threshold, it is determined whether the volume of the conference site is lower than the second preset threshold. If yes, perform step S409; otherwise, perform step S410.

The foregoing first threshold and second threshold are preset reference values used for evaluating a speaking effect. The second threshold is greater than the first threshold, and both may be set according to an actual requirement.

Step S409: Record the speaking effect of the third participant as good.

When the volume of the conference site is higher than the first threshold but lower than the second threshold, the speaking effect of the third participant is recorded as good.

Step S410: Record the speaking effect of the third participant as excellent.

When the volume of the conference site is not lower than the second threshold, the speaking effect of the third participant is recorded as excellent.

The foregoing several implementation manners are merely several specific examples of collecting information of a video communication process in an implementation manner of an information processing method for video communication in this application. A same or similar manner may also be used to collect other information of the video communication process, and examples are not provided herein.

Generally, more than one subject is involved in each video communication.

Discussion time of each subject may be recorded as reference for determining significance of the subject. Based on the foregoing voice identification technology, start time of video communication $CT_s$, end time of the video communication $CT_e$, start time of a subject $DT_s$, and end time of the subject $DT_e$ may be further acquired by using a video technology. Formulas for calculating conference duration $CT_d$ and discussion duration of the subject $DT_d$ are as follows:

$$CT_d = CT_e - CT_s,$$

$$DT_d = DT_e - DT_s.$$

For existing information, that is, initialized information including a quantity of conference sites, a quantity of expected attendees, and a quantity of actually present attendees in each conference site, the quantity of conference sites and the quantity of expected attendees in each conference site remain unchanged and do not need to be updated.

A formula for calculating actual duration of the current video communication is as follows: $CT_a = CT_d - HT_l$, where $CT_a$ is the actual duration of the current video communication; $CT_d$ is duration of the current video communication; and $HT_l$ is duration of a break in the current video communication.

For an attendance rate of each conference site, a formula for calculating an attendance rate of a single conference site is as follows:

$$AR = N_a/N_p,$$

where AR is an attendance rate of a conference site; $N_a$ is a quantity of actually present attendees of a conference site; and $N_p$ is a quantity of expected attendees of a conference site.

Information about overall performance of each participant may be further acquired by using combination of the voice identification and video technologies, for example, absent or not, a quantity of speaking times, speaking duration, and a speaking effect. A formula for calculating effective duration in a conference is as follows:

$PT_v = PT_s - PT_e - HT_l - T_l - DT_l$, where $PT_v$ is effective duration in a conference; $PT_s$ is start time of a participant; $PT_e$ is end time of the participant; $HT_l$ is duration of a break; $T_l$ is duration of absence from a conference site midway; and $DT_l$ is duration of lack of concentration (dozing off) in a conference.

A formula for calculating an attendance rate of a conference site is as follows:

$$MAR_n = (MAR_h \times MN_n + AR)/(MN_n + 1),$$

where $MAR_n$ indicates a latest attendance rate of a conference site; $MAR_h$ is a historical attendance rate of the conference site; $MN_n$ is a quantity of historical video communication times corresponding to the conference site; and AR is an attendance rate of the conference site in the current video communication.

Based on the foregoing obtained data information, if attendance rates of all conference sites, effective presence duration of a participant, and a ratio of speaking duration of a participant to duration of the current video communication, which are obtained from information of the current video communication process, are all greater than a preset evaluation value of an video communication effect, evaluation information of the current video communication that includes at least information that an overall effect of the current video communication is good is obtained; otherwise, evaluation information of the current video communication that includes at least information that an effect of the current video communication is poor is obtained. The evaluation value of the video communication effect may be set according to an actual condition of the video communication.

If both duration of a subject in the current video communication and total speaking duration within the duration of the subject, which are obtained from the information of the current video communication process, are greater than a preset evaluation value of an interested subject, the evaluation information of the current video communication that includes at least information that the subject is an interested subject is obtained; otherwise, the evaluation information of the current video communication that includes at least information that the subject is an uninterested subject is obtained.

Figure 7:
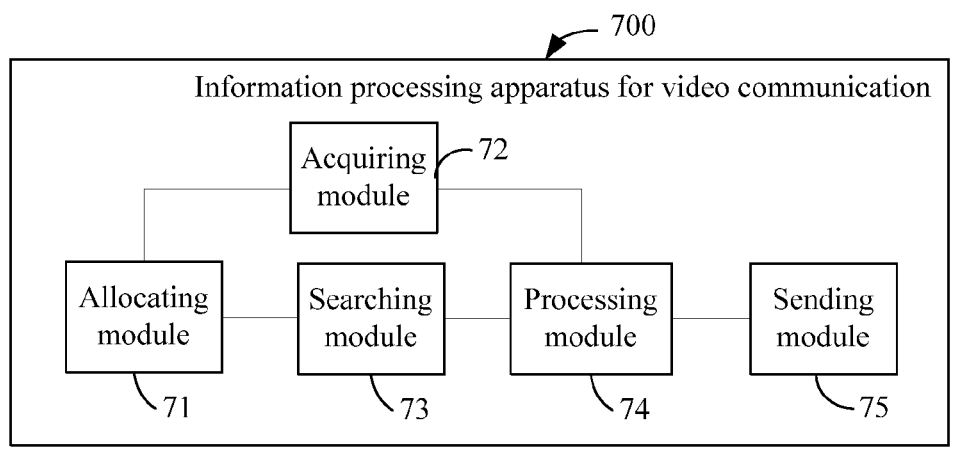
FIG. 7 is a schematic structural diagram of an information processing apparatus for video communication according to an implementation manner of this application.

Referring to FIG. 7, FIG. 7 is a schematic structural diagram of an implementation manner of an information processing apparatus for video communication according to this application. The information processing apparatus 700 for video communication includes an allocating module 71, an acquiring module 72, a searching module 73, a processing module 74, and a sending module 75.

The allocating module 71 is configured to identify each participant in current video communication, and allocate a unique participant identity and a corresponding role identifier to each participant in the current video communication.

The allocating module 71 automatically identifies each video communication participant. For example, the video communication participant may be identified by means of fingerprint identification, retina identification, video analysis, or voice identification. Moreover, the allocating module 71 allocates the unique participant identity such as an ID number to each video communication participant, and allocates the role identifier to each video communication participant, where the role identifier may include a moderator, a presenter, an assistant, an administrator, and a common participant. Generally, one video communication participant has only one role identifier, and certainly, may also have two or more role identifiers at the same time according to a requirement.

The acquiring module 72 is configured to acquire initialization information of the current video communication, collect information of a current video communication process, and send the initialization information of the current video communication and the information of the current video communication process to the processing module 74.

The acquiring module 72 acquires the initialization information of the current video communication by initializing a current video communication system. The initialization information of the video communication includes but is not limited to, information about a quantity of conference sites, for example, there are three conference sites in the current video communication; information about a quantity of expected attendees in each conference site, for example, three persons are expected in each conference site; information about a quantity of actually present attendees in each conference site, for example, the quantity of actually present attendees in conference sites A, B, and C is 2, 2, and 1, respectively; information about an absent person, for example, Wang in conference site A, Ding in conference site B, and Zhang and Li in conference site C are absent; start time of the current video communication, for example, the start time of the current video communication is 9:30; information about initial time when each participant of the current video communication is present, for example, time when a participant initially enters a conference site before the start time of the video communication may be set as the start time of the video communication, and time when a participant initially enters a conference site after the start time of the video communication may be set as time when the participant actually enters the conference site; and information of each participant, for example, contact information of a participant, which may include a mobile phone number, a QQ number, a Wechat number, an email box, and the like of the participant.

The initialization information of the video communication is output to relevant personnel such as a secretary or presenter of the video communication in real time, so that the relevant personnel may take a corresponding action according to an actual condition. For example, the secretary may instruct in time absent personnel to enter a conference site in time, the presenter may also delay the start time of the video communication properly in a case in which many participants are absent, or the like.

The acquiring module 72 further acquires the information in the video communication process by means of audio and video combination. For example, information of a video communication site is acquired in real time by means of combining a face identification and tracking technology and a voice identification technology. The information of the video communication process includes but is not limited to real-time information during the video communication, for example, information about a conference site condition, participant status information, and video communication status information.

The conference site condition includes but is not limited to break information of the video communication, for example, there are two breaks in the current video communication, 15 minutes for each break; information about a person who leaves a conference site and absence time information in the video communication, for example, Wang in conference site A leaves for 20 minutes in the video communication; and information of a person who enters the conference site midway and entrance time, for example, Zhang enters conference site C midway in the video communication. Certainly, in order to record more detailed information, a specific time point may be further included, for example, Zhang enters conference site C at 15:43.

The participant status information includes but is not limited to status information when a participant lacks concentration, including status information when the participant is performing discussion, lowers his/her head, dozes off, and plays with a mobile phone, for example, Li in conference site B dozes off for half an hour; information about a quantity of speaking times of a participant and speaking duration, for example, Zhang in conference site C speaks for three times, two minutes for each time of speaking and six minutes in total; and reaction information of another participant after each time of speaking, for example, two times of speaking by Zhang in conference site C gain applause.

The acquiring module 72 sends the foregoing acquired information to the processing module 74 for processing.

The searching module 73 is configured to obtain, by means of search according to an association relationship between a role identifier of a participant in the current video communication and a preset policy, the preset policy corresponding to the participant in the current video communication; and send the preset policy to the processing module 74.

Generally, each video communication participant focuses on different video communication-related information due to a different role. For example, a conference site administrator focuses on a conference site attendance rate, but is not interested in participants' information. For example, participant A is concerned with his/her own video communication attendance rate and performance information, but is not interested in relevant information of participant B and is unwilling to let another participant learn about his/her own video communication information. Therefore, it may be set that different role identifiers correspond to different policies of processing video communication information.

The searching module 73 may obtain, by means of search according to the role identifier of the participant in the current video communication, the preset policy corresponding to the participant in the current video communication; and send the obtained preset policy to the processing module 74, so that the processing module 74 processes the information of the video communication according to the preset policy.

The processing module 74 is configured to summarize the initialization information and the information of the current video communication process by using the obtained preset policy, to obtain evaluation information that is of the participant in the current video communication and that is about the current video communication, and send, to the sending module 75, the evaluation information that is of the participant in the current video communication and that is about the current video communication.

The processing module 74 summarizes the initialization information and the information of the current video communication process by using the obtained preset policy, to obtain video communication evaluation information for different roles of video communication participants.

The video communication evaluation information includes but is not limited to at least one of the following video communication evaluation information: video communication evaluation information that is suitable for a video communication assistant to view and includes at least real-time video communication information, overall video communication information, information about overall performance of each participant, a subject of the video communication, and information about an interested subject, for example, there are three conference sites (A, B, and C) in the current video communication, three persons are expected in each conference site, the quantity of actually present attendees in each conference site is 2, and one person is absent in each conference site; actual duration of the current video communication is 2 hours, with a break of 0.5 hours; attendance rates of conference site A, conference site B, and conference site C are 100%, 100%, and 66.7% respectively; presence time of Wang in conference site A is 2 hours, with effective presence time of 1.5 hours (the effective presence time is obtained by subtracting time in a case of lack of concentration from total presence time), and presence time/effective presence time of another person is 2 hours; presence time of Li in conference site B is 2 hours, with effective presence time of 1.5 hours, and presence time/effective presence time of another person is 2 hours; presence time/effective presence time of 2 persons in conference site C are 2 hours each; and "technical solution" and "product prospect" are relatively interested subjects, where the assistant may report such video communication evaluation information to a leader in an oral or written form; video communication evaluation information that is suitable for a common video communication participant to view and includes at least overall information of the current video communication and information of a common participant's own overall performance, for example, video communication evaluation information for a common participant Wang may include the current video communication lasts 2.5 hours, with an effective duration of 2 hours and a break of 0.5 hours; Wang dozes off for 0.5 hours; Wang speaks for 8 times; content corresponding to the speaking; Wang wins applause for six times; there is a heated discussion about "technical solution"; and "product prospect" gains most laughter and applause; video communication evaluation information that is suitable for a presenter/moderator of the video communication to view and includes at least overall information of the current video communication, information about overall performance of each participant, a subject of the video communication, and information about an interested subject, for example, a participant attendance rate of the current video communication is high; one person enters conference site B midway; Wang in conference site A leaves the conference site for 0.5 hours; Li in conference site B dozes off for 0.5 hours; Zhang in conference site C actively speaks and gains agreement after speaking; there is a very heated discussion about a subject "technical solution"; and "technical solution" and "product prospect" are relatively interested subjects; and video communication evaluation information that is suitable for an administrator to view and includes at least attendance rate information of a conference site, for example, attendance rates of conference site A, conference site B, and conference site C in the current video communication are 100%, 100%, and 66.7% respectively.

The foregoing is merely an example of generating different corresponding video communication evaluation information according to different video communication roles in this implementation manner. In an actual application process, a policy may be set according to a requirement, so that content included in the generated video communication evaluation information corresponding to each role can meet an actual requirement of a video communication participant.

The processing module 74 outputs the video communication evaluation information obtained by processing to the sending module 75, so that the sending module 75 sends the video communication evaluation information to the video communication participant.

The sending module 75 is configured to send, to the participant in the current video communication, the obtained evaluation information that is of the participant in the current video communication and that is about the current video communication.

The sending module 75 sends, to the participant in the current video communication by using at least one of a mobile terminal (such as a mobile phone and a Pad), an email, and an instant messaging tool (such as QQ and MSN), the obtained evaluation information that is of the participant in the current video communication and that is about the current video communication.

The video communication participant may view the video communication evaluation information (including video communication evaluation information in any form of a text/ an image/a video/a voice, or the like) by using a conference control touchscreen, a mobile terminal such as a mobile phone, an email box, or the like.

The video communication mentioned in foregoing implementation manner includes any activity that is performed in a video form and has at least two participants, for example, includes but is not limited to a videoconference, tele-education, or the like.

In an implementation manner of the information processing apparatus for video communication in this application, the acquiring module 72 is configured to, when detecting, by using a face tracking technology, that a face of a first participant is absent in an image, search for the face of the first participant to acquire a first participant identity, and record the first participant identity and time when the first participant whose face is absent in the image leaves a conference site.

The acquiring module 72 is further configured to, when detecting, by using the face tracking technology, that a new face appears, determine whether the new face matches the recorded first participant identity; and if yes, record time when the first participant returns to the conference site; if not, instruct the allocating module 71 to allocate a participant identity to the new face, and record time when the new face enters the conference site.

The acquiring module 72 is further configured to, when detecting, by using the face tracking technology, that a quantity of faces in the image is less than a preset numerical value, record current time as start time of a break; and when detecting, by using the face tracking technology, that the quantity of faces in the image reaches a preset numerical value again, record current time as end time of the break.

In an implementation manner of the information processing apparatus for video communication in this application, the acquiring module 72 is configured to detect, by using a face tracking technology, a face of a second participant; further detect, by using an expression identification technology, whether the face of the second participant is in a dozing state; if yes, search out a corresponding second participant identity according to the face of the second participant who dozes off; and record the second participant identity as well as start time and end time of the dozing state.

In an implementation manner of the information processing apparatus for video communication in this application, the acquiring module 72 is configured to, when detecting, by using a voice identification technology, a voice of a third participant, search out a third participant identity according to the voice of the third participant, and record the third participant identity and time when the third participant starts speaking.

The acquiring module 72 is further configured to, when detecting, by using the voice identification technology, that the voice of the third participant ends, record time when the third participant finishes speaking, and detect volume of a conference site at current time.

Further, the acquiring module 72 is further configured to, when the volume of the conference site is lower than a first preset threshold, record a speaking effect of the third participant as fair; when the volume of the conference site is higher than the first preset threshold but is lower than a second preset threshold, record the speaking effect of the third participant as good; and when the volume of the conference site is higher than the second preset threshold, record the speaking effect of the third participant as excellent, where the second threshold is greater than the first threshold.

Further, the acquiring module 72 is configured to, when detecting, for the first time, that the third participant speaks, initialize a quantity of speaking times of the third participant as 1; otherwise, increase a quantity of speaking times of the third participant by 1.

In an implementation manner of the information processing apparatus for video communication in this application, the acquiring module 72 is configured to acquire, by initializing a current video communication system, the initialization information of the current video communication, including at least a quantity of conference sites, information about a quantity of expected attendees in each conference site, information about a quantity of actually present attendees in each conference site, information about a quantity of absent attendees in each conference site, information about start time of the current video communication, information about initial time when each participant of the current video communication is present, and information of each participant.

In an implementation manner of the information processing apparatus for video communication in this application, the sending module 75 is configured to send, to the participant in the current video communication by using at least one of a mobile terminal, an email, and an instant messaging tool, the obtained evaluation information that is of the participant in the current video communication and that is about the current video communication.

Figure 8:
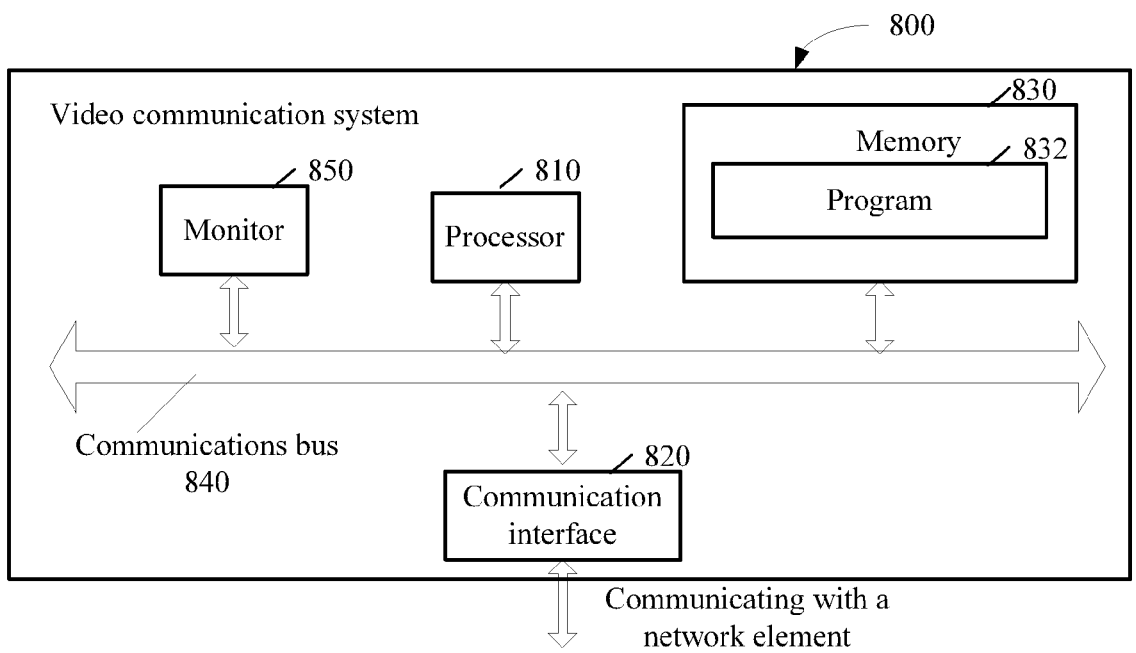
FIG. 8 is a schematic structural diagram of a video communication system according to an implementation manner of this application.

Referring to FIG. 8, FIG. 8 is a schematic structural diagram of an implementation manner of a video communication system according to this application. The video communication system 800 includes a processor 810, a communication interface 820, a memory 830, a communication bus 840, and a monitor 850, where the processor 810, the memory 830, and the monitor 850 are all connected to a power supply.

The processor 810, the communication interface 820, and the memory 830 communicate with each other by using the bus 840.

The communication interface 820 is configured to communicate with a network element, for example, a virtual machine management center, a shared memory, or the like.

The processor 810 is configured to obtain, by means of search according to an association relationship between a role identifier of a participant in current video communication and a preset policy, the preset policy corresponding to the participant in the current video communication; use the obtained preset policy to summarize initialization information and information of a current video communication process, to obtain evaluation information that is of the participant in the current video communication and that is about the current video communication; and send the video communication evaluation information to the video communication participant.

The processor 810 may be a central processing unit (CPU), or is an application specific integrated circuit (ASIC), or is configured as one or more integrated circuits implementing the implementation manner of this application.

The monitor 850 is configured to identify each participant in the current video communication; allocate a unique participant identity and a role identifier to each participant in the current video communication; collect the information of the video communication process by using a video or audio technology; and store the collected information of the video communication process in the memory 830.

The memory 830 is configured to store the information of the video communication process and relevant parameter setting information. If the implementation manner of this application is implemented by using a software program, the memory 830 is further configured to store a software program 832 that needs to be executed by the processor 810.

The memory 830 may include a high-speed random-access memory (RAM) memory, or may further include a non-volatile memory (non-volatile memory), for example, at least one disk memory.

The processor 810 is further configured to execute the program 832.

The program 832 may include program code, where the program code includes a computer operation instruction.

The program 832 may include an allocating module 71 configured to identify each participant in the current video communication, and allocate the unique participant identity and the role identifier to each participant in the current video communication; an acquiring module 72 configured to acquire the initialization information of the current video communication, collect the information of the current video communication process, and send the initialization information of the current video communication and the information of the current video communication process to a processing module 74; a searching module 73 configured to obtain, by means of search according to the association relationship between the role identifier of the participant in the current video communication and the preset policy, the preset policy corresponding to the participant in the current video communication; and send the preset policy to the processing module 74; the processing module 74 configured to summarize the initialization information and the information of the current video communication process by using the obtained preset policy, to obtain the evaluation information that is of the participant in the current video communication and that is about the current video communication, and send, to a sending module 75, the evaluation information that is of the participant in the current video communication and that is about the current video communication; and the sending module 75 configured to send, to the participant in the current video communication, the obtained evaluation information that is of the participant in the current video communication and that is about the current video communication.

For specific implementation of the modules in the program 832, reference may be made to the corresponding modules in the implementation manner shown in FIG. 7.

According to the description of the foregoing implementation manners, in the implementation manners of the information processing method and apparatus for video communication provided in this application, a preset policy corresponding to a participant in current video communication is obtained by means of search according to an association relationship between a role identifier of the participant in the current video communication and the preset policy; and initialization information and information of the current video communication process are summarized by using the preset policy, to obtain evaluation information that is of the participant in the current video communication and that is about the current video communication. In this manner, initialization information of video communication and information of a video communication process can be fully used, and information is processed by using a preset policy with reference to roles of different participants, so as to obtain different video communication evaluation information for different roles. Therefore, a participant can obtain video communication evaluation information corresponding to a role of the participant, which not only saves the participant's time of reading video communication evaluation data, but also can obtain video communication evaluation data helpful to the participant, thereby effectively improving a video communication effect.

In addition, collected information and the obtained video communication evaluation information are further saved and are summarized comprehensively with reference to historical video communication information, so as to explore a corresponding new video communication adjustment or improvement policy for reference and decision of relevant personnel, which provides help for the relevant personnel in planning of next video communication.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The functional modules described as separate parts may or may not be physically separate, and parts displayed as units may or may not be physical units, may be located in one position, or may be distributed on a plurality of network units. A part or all of the units may be selected according to actual requirements to achieve the objectives of the solutions of the implementation manners.

In addition, functional modules in the embodiments of this application may be integrated into one processing unit, or each of the functional modules may exist alone physically, or two or more functional modules are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely embodiments of this application, and are not intended to limit the scope of this application. An equivalent structural or equivalent process alternation made by using the content of the specification and drawings of this application, or an application of the content of the specification and drawings directly or indirectly to another related technical field, shall fall within the protection scope of this application.

What is claimed is:

1. An information processing method for video communication, comprising:
   identifying each participant in current video communication;
   allocating a unique participant identity and a role identifier to each participant in the current video communication;
   acquiring initialization information of the current video communication;
   collecting information of a current video communication process;
   obtaining, by means of search according to an association relationship between a role identifier of a participant in the current video communication and a preset policy, the preset policy corresponding to the participant in the current video communication;
   summarizing the initialization information and the information of the current video communication process by using the obtained preset policy, to obtain evaluation information that is of the participant in the current video communication and that is about the current video communication; and
   sending, to the participant in the current video communication, the obtained evaluation information that is of the participant in the current video communication and that is about the current video communication.

2. The method according to claim 1, wherein the step of collecting the information of the current video communication process comprises, when detecting, by using a face tracking technology, that a face of a first participant is absent in an image, searching for the face of the first participant to acquire a first participant identity, and recording the first participant identity and time when the first participant whose face is absent in the image leaves a conference site.

3. The method according to claim 2, wherein the step of collecting the information of the current video communication process further comprises, when detecting, by using the face tracking technology, that a new face appears in the image, determining, by means of search, whether the new face matches the recorded first participant identity, and when the new face matches the record first participant identity, recording time when the first participant returns to the conference site, and when the new face does not match the record first participant identity, allocating a participant identity to the new face and recording time when the new face enters the conference site.

4. The method according to claim 2, wherein the step of collecting the information of the current video communication process comprises, when detecting, by using the face tracking technology, that a quantity of faces in the image is less than a preset numerical value, recording current time as start time of a break, and when detecting, by using the face tracking technology, that the quantity of faces in the image reaches a preset numerical value, recording current time as end time of the break.

5. The method according to claim 1, wherein the step of collecting the information of the current video communication process comprises detecting, by using a face tracking technology, a face of a second participant, and further detecting, by using an expression identification technology, whether the face of the second participant is in a dozing state, when the face of the second participant is in a dozing state, searching out a second participant identity according to the face of the second participant who dozes off, and recording the second participant identity as well as start time and end time of the dozing state.

6. The method according to claim 1, wherein the step of collecting the information of the current video communication process comprises, when detecting, by using a voice identification technology, a voice of a third participant, searching out a third participant identity according to the voice of the third participant, and recording the third participant identity and time when the third participant starts speaking.

7. The method according to claim 6, wherein the step of collecting the information of the current video communication process further comprises, when detecting, by using the voice identification technology, that the voice of the third participant ends, recording time when the third participant finishes speaking.

8. The method according to claim 6, wherein the step of collecting the information of the current video communication process further comprises detecting volume of a conference site at current time, when the volume of the conference site is lower than a first preset threshold, recording a speaking effect of the third participant as fair, when the volume of the conference site is higher than the first preset threshold but is lower than a second preset threshold, recording the speaking effect of the third participant as good, and when the volume of the conference site is higher than a second preset threshold, recording the speaking effect of the third participant as excellent, wherein the second threshold is greater than the first threshold.

9. The method according to claim 6, wherein the step of collecting the information of the current video communication process further comprises, when detecting, for the first time, that the third participant speaks, initializing a quantity of speaking times of the third participant as 1, and otherwise, increasing the quantity of speaking times of the third participant by 1.

10. The method according to claim 1, wherein the step of acquiring the initialization information of the current video communication comprises acquiring, by initializing a current video communication system, the initialization information of the current video communication, including at least a quantity of conference sites, information about a quantity of expected attendees in each conference site, information about a quantity of actually present attendees in each conference site, information about a quantity of absent attendees in each conference site, information about start time of the current video communication, information about initial time when each participant of the current video communication is present, and information of each participant.

11. The method according to claim 1, wherein sending, to the participant in the current video communication, the obtained evaluation information that is of the participant in the current video communication and that is about the current video communication comprises sending, to the participant in the current video communication by using at least one of a mobile terminal, an email, and an instant messaging tool, the obtained evaluation information that is of the participant in the current video communication and that is about the current video communication.

12. The method according to claim 1, wherein allocating the unique participant identity and the role identifier to each participant in the current video communication comprises allocating, to each participant in the current video communication, the unique participant identity and at least one role identifier of a moderator, a presenter, an assistant, an administrator, and a common participant.

13. The method according to claim 12, wherein the step of summarizing the initialization information and the information of the current video communication process by using the obtained preset policy, to obtain evaluation information that is of the participant in the current video communication and that is about the current video communication comprises at least one of the following operations of acquiring video communication evaluation information: summarizing the initialization information and the information of the current video communication process by using an obtained preset policy of the moderator/presenter, to obtain the video communication evaluation information, including at least overall information of the current video communication, information about overall performance of each participant, a subject of the video communication, and information about an interested subject; summarizing the initialization information and the information of the current video communication process by using an obtained preset policy of the assistant, to obtain the video communication evaluation information, including at least real-time video communication information, overall video communication information, information about overall performance of each participant, a subject of the video communication, and information about an interested subject; summarizing the initialization information and the information of the current video communication process by using an obtained preset policy of the common participant, to obtain the video communication evaluation information, including at least overall information of the current video communication and information of overall performance of the common participant; and summarizing the initialization information and the information of the current video communication process by using an obtained preset policy of the administrator, to obtain the video communication evaluation information, including at least attendance rate information of a conference site.

14. An information processing apparatus for video communication, comprising:
an allocating module;
an acquiring module;
a searching module;
a processing module; and
a sending module,
wherein the allocating module is configured to identify each participant in current video communication, and allocate a unique participant identity and a role identifier to each participant in the current video communication, wherein the acquiring module is configured to acquire initialization information of the current video communication, collect information of a current video communication process, and send the initialization information of the current video communication and the information of the current video communication process to the processing module, wherein the searching module is configured to obtain, by means of search according to an association relationship between a role identifier of a participant in the current video communication and a preset policy, the preset policy corresponding to the participant in the current video communication and send the preset policy to the processing module, wherein the processing module is configured to summarize the initialization information and the information of the current video communication process by using the obtained preset policy, to obtain evaluation information that is of the participant in the current video communication and that is about the current video communication, and send, to the sending module, the evaluation information that is of the participant in the current video communication and that is about the current video communication, and wherein the sending module is configured to send, to the participant in the current video communication, the obtained evaluation information that is of the participant in the current video communication and that is about the current video communication.

15. The apparatus according to claim 14, wherein the acquiring module is configured to, when detecting, by using a face tracking technology, that a face of a first participant is absent in an image, search for the face of the first participant to acquire a first participant identity, and record the first participant identity and time when the first participant whose face is absent in the image leaves a conference site.

16. The apparatus according to claim 15, wherein the acquiring module is further configured to, when detecting, by using the face tracking technology, that a new face appears, determine whether the new face matches the recorded first participant identity, and when the new face matches the recorded first participant identity, record time when the first participant returns to the conference site, and when the new face does not match the recorded first participant identity, instruct the allocating module to allocate a participant identity to the new face, and record time when the new face enters the conference site.

17. The apparatus according to claim 15, wherein the acquiring module is further configured to, when detecting, by using the face tracking technology, that a quantity of faces in the image is less than a preset numerical value, record current time as start time of a break, and when detecting, by using the face tracking technology, that the quantity of faces in the image reaches a preset numerical value, record current time as end time of the break.

18. The apparatus according to claim 14, wherein the acquiring module is configured to detect, by using a face tracking technology, a face of a second participant, and further detect, by using an expression identification technology, whether the face of the second participant is in a dozing state, and when the face of the second participant is in a dozing state, search out a corresponding second participant identity according to the face of the second participant who dozes off, and record the second participant identity as well as start time and end time of the dozing state.

19. The apparatus according to claim 14, wherein the acquiring module is configured to, when detecting, by using a voice identification technology, a voice of a third participant, search out a third participant identity according to the voice of the third participant, and record the third participant identity and time when the third participant starts speaking.

20. The apparatus according to claim 19, wherein the acquiring module is further configured to detect volume of a conference site at current time, when the volume of the conference site is lower than a first preset threshold, record a speaking effect of the third participant as fair, when the volume of the conference site is higher than the first preset threshold but is lower than a second preset threshold, record the speaking effect of the third participant as good, and when the volume of the conference site is higher than the second preset threshold, record the speaking effect of the third participant as excellent, wherein the second threshold is greater than the first threshold.

21. The apparatus according to claim 14, wherein the allocating module is configured to identify each participant in the current video communication, and allocate, to each participant in the current video communication, the unique participant identity and at least one role identifier of a moderator, a presenter, an assistant, an administrator, and a common participant, wherein the processing module is configured to perform at least one of the following operations of summarizing the initialization information and the information of the current video communication process by using the obtained preset policy, to obtain video communication evaluation information: summarizing the initialization information and the information of the current video communication process by using an obtained preset policy of the moderator/presenter, to obtain the video communication evaluation information, including at least overall information of the current video communication, information about overall performance of each participant, a subject of the video communication, and information about an interested subject; summarizing the initialization information and the information of the current video communication process by using an obtained preset policy of the assistant, to obtain the video communication evaluation information, including at least real-time video communication information, overall video communication information, information about overall performance of each participant, a subject of the video communication, and information about an interested subject; summarizing the initialization information and the information of the current video communication process by using an obtained preset policy of the common participant, to obtain the video communication evaluation information, including at least overall information of the current video communication and information of overall performance of the common participant; and summarizing the initialization information and the information of the current video communication process by using an obtained preset policy of the administrator, to obtain the video communication evaluation information, including at least attendance rate information of a conference site.

* * * * *